Aug. 24, 1954   W. H. TANKE ET AL   2,687,074
TOOL MOUNTING FOR AGRICULTURAL IMPLEMENTS
Filed Oct. 27, 1948
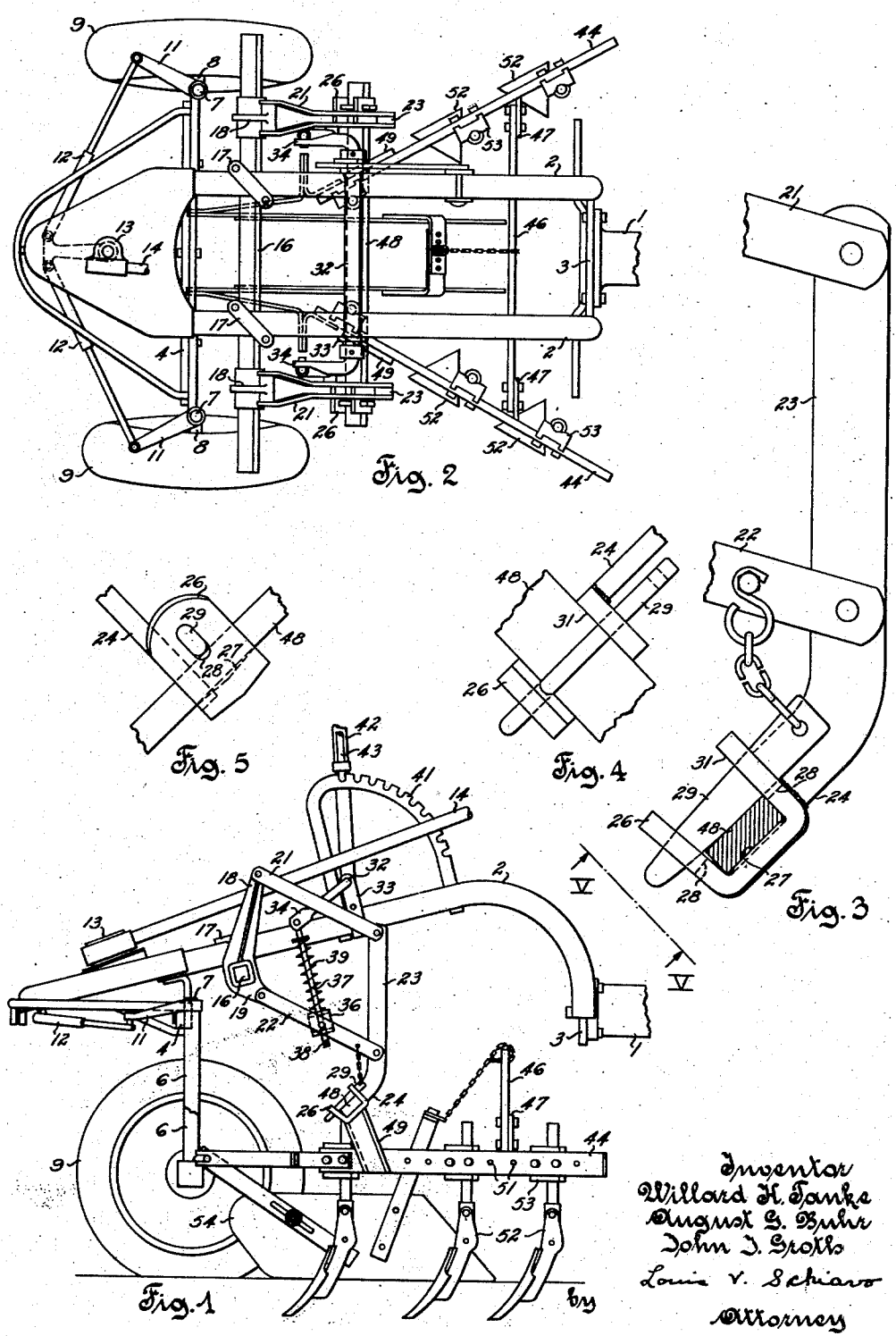

Patented Aug. 24, 1954

2,687,074

UNITED STATES PATENT OFFICE 2,687,074

TOOL MOUNTING FOR AGRICULTURAL IMPLEMENTS

Willard H. Tanke, August G. Buhr, and John J. Groth, La Crosse, Wis., assignors to Allis-Chalmers Manufacturing Company, Milwaukee, Wis., a corporation of Delaware Application October 27, 1948, Serial No. 56,842

5 Claims. (Cl. 97—47.11)

This invention relates generally to implement attachments and is more particularly concerned with a design of implement support and/or coupling for bodily removably attaching an implement to a traveling support or vehicle, hereinafter referred to as a tractor.

In the attachment of tractor mounted implements, it has heretofore been customary to fixedly detachably secure a rigid draft bar to the front end of the tractor to extend laterally beyond the opposite sides thereof or to so attach a pair of rigid draft bars in end abutting outwardly extending relation with respect to opposite forward side portions of the tractor and to detachably pivotally connect one or more tool rigs or implements in suspended rearwardly extending relation to the draft bar, these tool rigs or implements being vertically swingable about transverse axes generally parallel to the draft bar and being detachably connectable with a lift mechanism for raising or lowering the implements. Usually each rig or implement is suspended from the draft bar through a linkage pivotally connected with a supporting hanger which is in turn detachably clamped or otherwise fastened to the draft bar for adjustment longitudinally thereof. And in most instances the lift mechanism comprises a rock shaft which may be carried by the tractor or directly by the draft bar, in generally parallel relation to the latter, a suitable linkage operatively connected with the rock shaft for actuating same, and a lift link connecting an arm on the rock shaft with an underlying portion of the implement or the linkage pivotally connecting the implement with the draft bar. Consequently, when it is desired to change the implements, it is necessary to disconnect the lift link and to either remove each rig as a unit from the draft bar by detaching the hanger or by disconnecting the linkage suspending the implement from the hanger. In some cases, the implement comprises a rigid frame structure which is detachably connected with rear or lower end portions of the hanger carried links and which can be removed by detaching the last mentioned connection. In any case, two or more connections must be detached to remove each implement, rig or implement frame and most such connections require the use of a special tool, such as a wrench.

It is, therefore, an object of this invention to provide an improved implement support and/or coupling incorporating parts constructed and combined for coaction in a manner permitting implements to be quickly attached to or removed from a tractor with a minimum of time, effort and skill and without the use of special tools.

Another object of the present invention is to provide an improved implement support and coupling combination utilizing a part of the implement frame as a draft bar and utilizing a simplified coupling between the implement draft bar and a vertically adjustable tractor carried support which permits the coupling to be fixedly secured to or removed from the implement draft bar upon manipulation of a single element.

Still another object of this invention is to provide an implement attachment with an improved coupling means having parts combinable for coaction in a manner affording a simplified, compact and inexpensive construction.

The manner of accomplishing the foregoing and other objects will become readily apparent as the disclosure progresses and points out those features considered of special importance. And accordingly the present invention may be considered as comprising the various constructions and/or combinations hereinafter more particularly set forth in the detailed description and appended claims, reference being had to the accompanying drawing illustrating but one embodiment of the invention, and in which:

Fig. 1 is a side view of the forward portion of a tractor having an implement mounted in vertically adjustable underslung relation thereto, the near side front wheel being omitted in the interest of clarity;

Fig. 2 is the plan view of the combination shown in Fig. 1 with some of the parts broken away and omitted to better show the mounting structure;

Fig. 3 is an enlarged partial view of the implement support and coupling shown in Fig. 1;

Fig. 4 is a projected plan view of Fig. 3; and

Fig. 5 is an end view taken on line V—V of Fig. 3.

Referring particularly to Figures 1 and 2, it will be seen that the tractor element of the combination includes a frame comprising a tubular frame part 1 extending forward from a wheel supported rear axle structure (not shown). A pair of laterally spaced upwardly arched tubular frame members 2 have their rear ends rigidly united with a transverse part 3 which, in turn, is fixedly secured to the forward end of central frame part 1. A transverse front axle structure 4 is secured to the forward end of the tubular frame members 2 for vertical swinging movement about a central longitudinal pivot axis. Each end of axle structure 4 mounts a depending tubular portion 6 supporting the vertical portion 7 of a wheel supporting spindle for turning movement about a vertical axis, the lower extremity of each spindle presenting an outwardly extending portion 8 rotatably mounting a front wheel 9. The upper ends of the vertical portions of each spindle are provided with arms 11 operatively connected through similar telescoping links 12 with a worm gear steering mechanism 13 for effecting simultaneous turning movement of front wheels 9. It is to be understood that the steering mechanism includes a rearwardly extending shaft 14 which mounts a steering wheel (not shown) disposed within easy reach of an operator sitting at his station (not shown) on the tractor. It is also to be understood, of course, that the tractor is provided with an engine and the usual operator actuated controls (not shown).

A rigid transverse cross bar 16 is secured to the underside of opposed forward portions of tubular frame members 2, immediately to the rear of front axle structure 4, by means of suitable clamps 17. Bar 16 is generally parallel to the transverse front axle structure 4 and preferably projects equal distances to either side of the frame members 2. A similar hanger member is secured on each end portion of bar 16 for adjustment longitudinally thereof and presents an upwardly extending arm 18 and a depending arm 19. The upper arm 18 of each hanger pivotally mounts a rearwardly extending link 21, and the lower arm 19 of each hanger pivotally mounts a rearwardly extending link 22. The rear ends of upper and lower main links 21 and 22, respectively, are pivotally connected with vertically spaced portions of a rigid rear link 23 so as to form a generally parallel linkage. The link 23 extends beneath the lower link 22 and terminates in a forwardly projecting end portion 24 mounting a U-shaped part or support 26 presenting an upwardly facing base surface 27 (note Fig. 3), which is inclined downward and forward at an angle of approximately 45 degrees relative to the ground. Opposed upper portions of the sides of each U-shaped part 26 are provided with aligned generally rectangular openings 28 therethrough adapted to receive a tapered key 29 of generally rectangular configuration in cross section. Tapered key 29 is preferably attached by a chain or other suitable means to any convenient part of the link structure, for example, lower link 22, so as not to become lost when removed from part 26. As best shown in Fig. 3, the rear side of U-shaped part 26 forms a right angle with base surface 27, and the front side of this part diverges upwardly a slight amount relative to the rear side to facilitate insertion of a rectangular draft bar element therebetween. And, in addition, it is to be understood that the laterally spaced similar hangers, one on each side of the tractor, are in transverse alignment relative to the longitudinal axis of the tractor, that the base surfaces 27 of parts 26 approximately coincide with a 45 degree plane passing therethrough and intersecting the ground in advance thereof, and that the rear side of each part 26 presents a forwardly facing plain surface 31 which is generally normal to base surface 27. Consequently, the laterally spaced surfaces 27 and 31 presented by the parts 26 on each side of the tractor are in generally transverse alignment. In addition, it should be noted that the link mechanism just described positions support parts 26 in vertically spaced underslung relation with respect to lower links 22.

A transverse rock shaft 32 is rotatably mounted on the top side of tractor frame members 2 by means of a pair of brackets 33 secured to the latter in any suitable manner. Rock shaft 32 is disposed in generally parallel relation to front axle structure 4 and cross bar 16 and has opposite end portions similarly bent at a right angle to its longitudinal axis so as to form crank or lift arms 34 positioned in forwardly and downwardly extending relation with respect to the main portion of this shaft and generally alongside the inner or tractor side of the adjacent upper link 21. Preferably shaft 32 is a conventional fabricated structure comprising a tubular main element telescopically receiving separate crank elements for selectively positioning arms 34 to conform with any selected lateral adjustment of the similar hanger members mounted on bar 16. The free end of each lift arm 34 has an operative lost-motion connection with an intermediate portion of the adjacent one of the links 22, this connection being a well known type comprising a pivot block 36, a lift rod 37 slidably extending through block 36, a pin 38 preventing withdrawal of rod 37 from block 36, and a compression spring 39 surrounding the intermediate portions of rod 37. A notched quadrant 41 and a lever 42 mounting a quadrant engaging latch 43 are operatively associated with rock shaft 32 for actuating and maintaining this shaft in any selected position to thereby simultaneously adjust the vertical position of U-shaped parts 26 relative to the frame members 2. Preferably lever 42 extends rearward to a point within easy reach of an operator seated at his station on the tractor (not shown). It should now be obvious that parts 26 may be considered as underslung vertically adjustable implement supports.

The implement frame comprises a pair of similar rigid bars 44 united in isosceles trapezoidal relation with respect to a pair of parallel vertical planes passing through opposed opposite end portions of the bars by means of an upwardly arched rigid brace 46 having its lower ends bolted or otherwise secured to upstanding brackets 47 on opposed rear end portions of tool bars 44 and by means of a rigid transverse draft bar 48 having laterally spaced portions thereof suitably secured, in any desired manner, to rigid upstanding brackets 49 on forward opposed portions of bars 44. Draft bar 48 is rectangular in cross section and is positioned so that its sides and included base surface are generally parallel to the bar receiving sides and base surfaces presented by U-shaped parts 26, which positions draft bar 48 with its narrow sides or edges generally normal to the line of vision of an operator seated at his station on the tractor and looking forward toward the ground directly behind and between the tractor front wheels, thereby affording the operator a substantially unrestricted close range view of the implement tools. Each tool bar 44 is provided with a longitudinal series of transverse holes 51 for selectively adjustably mounting one or more conventional type tools 52, the tool attaching connector 53 also being conventional. Therefore, a further description of this part of the construction is deemed unnecessary for a complete understanding of the present invention. If desired, vertically disposed plant guards or shields 54 may be supported from tool bars 44 and the upwardly arched rigid brace 46.

In attaching the implement frame to the tractor, the operator may manually place the frame, which is supported on the ground, under the tractor between the front and rear wheels thereof, or he may drive the tractor into this position relative to the frame. Then by moving the tractor as may be required and manipulating lever 42, the U-shaped parts 26 are brought to underlying, receiving relation to laterally spaced portions of draft bar 48. Lever 42 is now pulled rearwardly to raise parts 26 until they supportingly receive or engage the laterally spaced portions of the draft bar, and tapered keys 29 are then inserted in aligned openings 28 of parts 26 to secure the draft bar in place. By further manipulation of lever 42, the implement frame may now be adjusted to any desired height. To detach the implement frame, assuming it to be supported on the ground, the forward ends of tapered keys 29 are tapped with any hard object and, when loosened, can be readily disengaged from parts 26 simply by pulling on the chains attaching them to lower links 22. Lever 42 is now pushed forward to lower parts 26 until they are disengaged from the laterally spaced portions of the draft bar. The operator may then drive the tractor away from the frame or manually remove the frame from under the tractor.

It should now be apparent that each implement support and/or coupling involves only a single securing or wedging element, namely, tapered key 29. This feature is important because the coupling, due to the simplicity of its construction, is cheap to manufacture. No special tool, such as a wrench, is required for inserting or removing this key, and, usually it may be inserted or removed without the operator dismounting from the tractor. Consequently, a minimum of time, effort, and skill are required to secure the draft bar element of an implement frame to the coupling or detach it therefrom. In addition, the necessity for detaching the lift mechanism or for disconnecting parts of the linkage supporting a tool rig or implement is eliminated, and a coupling is provided which permits an implement frame carrying any number of tool rigs or implements to be bodily attached to or removed from a tractor. It is to be understood that the apparatus herein shown and described is merely illustrative, that the invention is applicable to other types of implements, and that the number and exact nature of the couplings employed may be varied as desired, within the scope of the appended claims.

It should be obvious that although the apparatus herein disclosed as embodying the invention has particular utility in the attachment of implements to a tractor, certain features are of more general application and that, therefore, it is not intended to limit the invention to the exact construction and combination herein shown and described for purposes of illustration as various modifications within the scope of the appended claims may occur to persons skilled in the art.

It is claimed and desired to secure by Letters Patent:

1. In combination with a tractor, a depending generally parallel linkage including a pair of main links vertically swingable about transverse pivot axes and including a vertically disposed end link terminating in a lower portion vertically spaced from and offset longitudinally with respect to the rear end of the lower one of said main links, a generally U-shaped part having an open end and being fixedly secured to the lower portion of said end link with its sides extending outward at an acute angle with respect to a vertical transverse plane, said open end exposing a base surface disposed approximately parallel to an inclined transverse plane passing downwardly therethrough and intersecting the ground in spaced relation thereto longitudinally of the tractor, an implement frame including a rigid generally rectangular draft bar element positioned between the sides of said U-shaped part and supported thereby with the inner surface of said element abutting said base surface, said part having aligned openings through the sides thereof disposed in proximate relation with respect to the adjacent outer side edges of said element, and an elongated key element inserted through said aligned openings with its inner edge abutting the outer surface of said draft bar element and with its outer edge in wedged engagement with the surfaces defining the outer sides of said openings.

2. In combination with a tractor, a pair of similar generally parallel linkages depending from opposite forward side portions of the tractor, said linkages each including a pair of main links vertically swingable about transverse pivot axes and including a vertically disposed rear link terminating in a forwardly extending lower portion positioned in underlying vertically spaced relation with respect to the lower one of said main links, a similar generally U-shaped part fixedly carried by the lower portion of each rear link and presenting open upper ends with the sides of said parts extending upward and forward in aligned transverse relation with respect to the direction of travel, said open upper ends exposing upwardly facing base surfaces disposed in alignment and approximately parallel to an inclined transverse plane passing downwardly therethrough and intersecting the ground in advance thereof, an implement frame including a rigid generally rectangular draft bar structure having laterally spaced portions thereof positioned between the sides of said U-shaped parts and supported thereby with the underside of said portions abutting said base surfaces, said parts each having aligned openings through the sides thereof disposed in proximate relation with respect to the upper adjacent side edges of said portions of said draft bar structure and extending thereabove, and a pair of key elements, one for each part, inserted through said aligned openings with their bottom edges abutting the top surface of said portions of draft bar structure and with their top edges in wedged engagement with the surfaces defining the top sides of said openings.

3. In combination with a tractor, a pair of similar generally parallel linkages depending from opposite forward side portions of the tractor, said linkages each including a pair of main links vertically swingable about transverse pivot axes and including a vertically disposed rear link terminating in a forwardly extending lower portion positioned in underlying vertically spaced relation with respect to the lower one of said main links, a similar generally U-shaped part fixedly carried by the lower portion of each rear link and presenting open upper ends with the sides of said parts extending upward and forward in aligned transverse relation with respect to the direction of travel, said open upper ends exposing upwardly facing base surfaces disposed in alignment and approximately parallel to an inclined transverse plane passing downwardly therethrough and intersecting the ground in advance thereof, the rear side of each part being disposed at a right angle with respect to the upwardly facing base surface thereof and the forward side of each part including at least an upper portion disposed in upwardly diverging relation with respect to said rear side, an implement frame including a rigid generally rectangular draft bar structure having laterally spaced portions thereof positioned between the sides of said U-shaped parts and supported thereby with the underside of said portions abutting said base surfaces, said parts each having aligned openings through the sides thereof disposed in proximate relation with respect to the upper adjacent side edges of said portions of said draft bar structure and extending thereabove, and a pair of key elements, one for each part, inserted through said aligned openings with their bottom edges abutting the top surface of said portions of said draft bar structure and with their top edges in wedged engagement with the surfaces defining the top sides of said openings.

4. In combination with a mobile structure, a quick detachable implement support comprising an elongated depending rigid element mounted for vertical adjustment relative to said structure, said element presenting a lower terminal portion which is offset from the upper portion of said depending element in the direction of travel, a generally U-shaped part having an open end and being fixedly secured in upwardly facing relation to said lower terminal portion of said element with the sides of said part extending in transverse relation to the direction of travel and presenting upper portions spaced from said upper portion of said depending element in the direction of travel, said open end exposing an upwardly facing base surface which is approximately parallel to an inclined transverse plane passing therethrough, said part having aligned openings through said upper portions of said sides, and a tapered key element inserted through said pair of openings and presenting an inner edge which is generally parallel to and spaced from said base surface when the outer edge of said key element is disposed in wedged engagement with the surfaces defining the outer sides of said openings.

5. In combination with a mobile structure, a quick detachable implement support comprising an elongated depending rigid element mounted for vertical adjustment relative to said structure, said element presenting a lower terminal portion which is offset from the upper portion of said depending element in the direction of travel, a generally U-shaped part having an open end and being fixedly secured in upwardly facing relation to said lower terminal portion of said element with the sides of said part extending in transverse relation to the direction of travel and presenting upper portions spaced from said upper portion of said depending element in the direction of travel, said open end exposing an upwardly facing base surface which is approximately parallel to an inclined transverse plane passing therethrough, an implement frame including a generally rectangular bar element supportedly positioned between said sides of said part and being held thereby against rotation with the inner surface of said bar element abutting said base surface, said part having aligned openings through said upper portions of said sides, and an elongated key element inserted through said aligned openings with its inner edge abutting the outer surface of said bar element and its outer edge in wedged engagement with the surfaces defining the outer sides of said openings.

References Cited in the file of this patent

UNITED STATES PATENTS

| Number | Name | Date |
|---|---|---|
| 220,571 | Brown | Oct. 14, 1879 |
| 697,058 | Willis et al | Apr. 8, 1902 |
| 1,375,854 | Mader | Apr. 26, 1921 |
| 1,546,495 | Lathrop | July 21, 1925 |
| 2,150,665 | Tuft | Mar. 14, 1939 |
| 2,152,891 | Kohnke | Apr. 4, 1939 |
| 2,223,375 | Le Tourneau | Dec. 3, 1940 |
| 2,302,842 | Cook | Nov. 24, 1942 |
| 2,375,970 | Williams | May 15, 1945 |
| 2,388,981 | Kuntz | Nov. 13, 1945 |

FOREIGN PATENTS

| Number | Country | Date |
|---|---|---|
| 35,027 | France | June 11, 1927 |
| | (3d addition to No. 571,562) | |